(12) United States Patent
Guzman et al.

(10) Patent No.: US 9,150,700 B2
(45) Date of Patent: Oct. 6, 2015

(54) WRINKLE REDUCTION IN UNCURED COMPOSITE LAMINATES

(75) Inventors: Juan C. Guzman, Seattle, WA (US); Douglas A. McCarville, Orting, WA (US); Daniel M. Rotter, Lake Forest Park, WA (US); Todd J. Washburn, Maple Valley, WA (US); Kurtis S. Willden, Kent, WA (US); Donald C. Darrow, Grand Prairie, TX (US)

(73) Assignee: THE BOEING COMPANY, Chicago, IL (US)

( * ) Notice: Subject to any disclaimer, the term of this patent is extended or adjusted under 35 U.S.C. 154(b) by 578 days.

(21) Appl. No.: 12/242,536

(22) Filed: Sep. 30, 2008

(65) Prior Publication Data

US 2010/0078845 A1    Apr. 1, 2010

(51) Int. Cl.
| | |
|---|---|
| *C08J 5/24* | (2006.01) |
| *B29C 70/30* | (2006.01) |
| *B29C 70/54* | (2006.01) |
| *B29C 35/02* | (2006.01) |

(52) U.S. Cl.
CPC . *C08J 5/24* (2013.01); *B29C 70/30* (2013.01); *B29C 70/543* (2013.01); *B29C 35/0261* (2013.01); *B29C 35/0266* (2013.01)

(58) Field of Classification Search
CPC ..................................................... B29C 70/543
USPC ............................................................ 264/70
See application file for complete search history.

(56) References Cited

U.S. PATENT DOCUMENTS

| | | | |
|---|---|---|---|
| 5,418,035 A | 5/1995 | Iguchi et al. | |
| 5,464,493 A | 11/1995 | Iguchi et al. | |
| 6,017,484 A | 1/2000 | Hale | |
| 6,432,236 B1 | 8/2002 | Leemon et al. | |
| 6,592,799 B1 * | 7/2003 | Christensen et al. | 264/442 |
| 2001/0011570 A1 * | 8/2001 | Roylance et al. | 156/73.1 |

FOREIGN PATENT DOCUMENTS

| | | |
|---|---|---|
| WO | 2009088699 A1 | 7/2009 |
| WO | 2010039665 A1 | 4/2010 |

OTHER PUBLICATIONS

PCT Report US 2009/058688, The Boeing Company, Dec. 22, 2009.
Extended European Search Report, dated Mar. 18, 2013, regarding Application No. EP12197711.0, 5 pages.

* cited by examiner

*Primary Examiner* — Larry Thrower
(74) *Attorney, Agent, or Firm* — Yee & Associates, P.C.

(57) ABSTRACT

Wrinkles are removed from fiber reinforced resin plies of an uncured composite layup by subjecting the wrinkles to vibration and pressure.

14 Claims, 5 Drawing Sheets

WRINKLE REDUCTION IN UNCURED COMPOSITE LAMINATES

TECHNICAL FIELD

This disclosure generally relates to fabrication of composite laminates, and deals more particularly with a method for reducing wrinkles in uncured laminates.

BACKGROUND

During the process of laying up multiple plies of uncured prepreg to form a composite laminate, wrinkles may sometimes form in one or more of the plies. Wrinkling may be due to, without limitation, a ply being deformed during the layup process, and/or to relatively high friction between the reinforcing fibers caused by the tackiness of the uncured resin. Wrinkles are undesirable because they may result in voids or discontinuities in the cured laminate.

In the past, wrinkles occurring in an uncured layup may be removed by applying heat and pressure to the wrinkles by manually "sweeping" the wrinkle using a hand tool that tends to flatten the wrinkle. This prior technique for removing wrinkles is time consuming, and in some cases, may be less than effective.

Accordingly, there is a need for a method of reducing or removing wrinkles from uncured fiber reinforced resin laminates that is rapid, effective and does not substantially alter the reinforcing fibers during the wrinkle reduction process.

SUMMARY

Wrinkles formed in uncured laminates during the layup process may be substantially reduced or removed by subjecting the wrinkles to a combination of high frequency, low amplitude vibrations, and pressure. The wrinkle reduction process is effective and results in minimal adverse alteration or disturbance of reinforcing fibers. Wrinkle reduction in uncured laminates may be achieved in less time compared with prior hand sweeping techniques, lending the method to high rate manufacturing applications, and may require minimal specialized equipment to carry out the wrinkle reduction process.

The disclosed method is particularly effective in reducing or removing wrinkles where plies of a layup have a tendency to bunch together, as in the case of hat stiffeners formed over ply transitions, the inner legs of drape form parts such as C and Z frames, and certain areas on I-shaped wing stringers for aircraft applications.

According to one disclosed method embodiment, reducing a wrinkle in a fiber reinforced prepreg resin ply comprises subjecting the wrinkle to vibrations. The wrinkle may be subjected to vibration by bringing a transducer head into contact with the ply, exciting the transducer to vibrate, and moving the transducer head over the wrinkle. The vibrations preferably have a high frequency and low amplitude. A protective sheet may be placed between the transducer head and the ply in order to protect the reinforcing fibers from deformation or alteration by the transducer head. Pressure may be applied to the wrinkle through the transducer head in order to enhance wrinkle reduction.

In accordance with another method embodiment, reducing wrinkles in an uncured composite layup, comprises: using a head to apply pressure to the layup in the area of the wrinkles; moving the head over the wrinkles as the pressure is being applied to the layup; and, applying vibrations to the wrinkles by vibrating the head as the pressure is being applied to the layup by the head. A sheet may be placed between the head and the layup in the area of the wrinkles in order to protect the reinforcing fibers in the layup, and pressure may be applied by the head to the layup by pressing the head against the sheet. The head may be excited using a high frequency, low amplitude signal.

According to a further method embodiment, fabricating a composite aircraft subassembly comprises: forming a multiply fiber-reinforced composite layup wherein at least one of the plies includes a wrinkle; reducing the wrinkle by using a transducer head to apply pressure to at least one ply in the area of the wrinkle, moving the transducer head over the ply; exciting the transducer head to vibrate as the transducer head applies pressure to the at least one ply; compacting the layup; and, curing the layup. The method may further comprise covering the wrinkle with a smooth sheet by placing the smooth sheet over at least a portion of the layup, applying pressure to at least one ply by pressing the transducer head against the sheet; and then removing the sheet from the layup after the wrinkle has been reduced.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
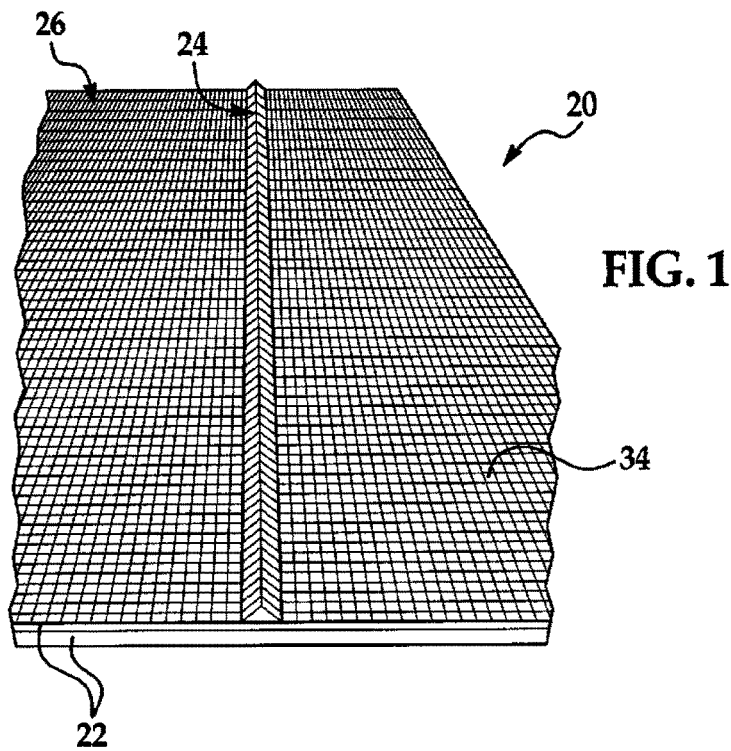
FIG. 1 is a perspective illustration of an uncured laminate having a wrinkle formed in upper plies thereof.
Figure 2:
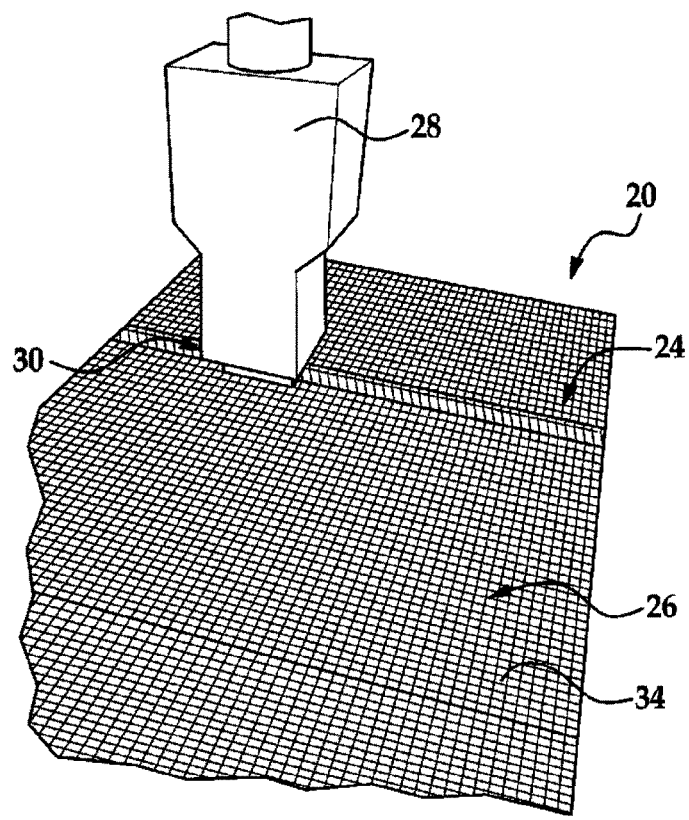
FIG. 2 is a perspective illustration of the uncured laminate shown in FIG. 1 and further depicting a vibrating transducer head pressed against the wrinkle.

Referring to FIG. 1, an uncured composite laminate 20 comprises multiple plies 22 of fiber reinforced, prepreg material such as, without limitation, reinforcing carbon fibers held in an epoxy resin matrix. The reinforcing fibers in the plies 22 may be woven or knitted and may have any of a variety of fiber orientations. In some cases, some of the plies 22 may comprise unidirectional fibers pre-impregnated with resin.

The laminate 20 may comprise for example, and without limitation, a layup 26 formed over tooling (not shown) used to shape the laminate 20 into a desired, composite structure. During the layup process in which the plies 22 are successively stacked over the tooling (not shown), one or more wrinkles 24, also referred to as buckles or buckling, may be formed in some or all of the plies 22. In some cases, the wrinkles 24 may be present in only the top one of the plies of the laminate 20.

The wrinkles 24 may be caused by, without limitation, irregularities in the manner in which the individual plies 22 are laid up, or may be the result of uneven surface areas, angles, etc. forming part of the tooling (not shown). In any event, the tackiness of the resin used as a matrix to hold the reinforcing fibers may create friction between the reinforcing fibers 34 as well as friction between adjacent plies 22 that may prevent relaxation of the wrinkles 24. It should be noted here that while a laminate 20 comprising prepreg plies 22 has been illustrated, the disclosed method embodiments may also be used to reduce wrinkles in a dry preform that is later infused with resin, where the preform uses a resin binder that may encourage wrinkling of preform plies. It should also be noted that while the method embodiment has been illustrated in connection with the reduction of wrinkles in a multi-ply layup 26, the method may also be advantageously used to reduce wrinkles in a single ply.

In accordance with the disclosed embodiments, the wrinkles 24 may be reduced, or in some cases may be eliminated, by the application of high frequency, low amplitude vibrations to the surface 34 of the laminate 20 in the area of the wrinkles 24. Furthermore, the application of pressure simultaneous with the application of the vibrational energy to the wrinkles 24 may enhance reduction of the wrinkles 24. In one embodiment, the vibrations are applied to the wrinkles 24 by means of a transducer head 28 having a smooth, lower face 30 that engages and applies pressure to the wrinkles 24 on the surface 34.

The transducer head 28 may comprise a commercially available device that converts electrical power into vibrational energy that is amplified and focused at the face 30. The frequency and amplitude of the applied vibrations will vary depending upon the application and a variety of factors, including but not limited to the thickness of the laminate 20, the type of the resin matrix, the diameter of the reinforcing fibers, the size of the transducer head 28 and the level of applied power. In one typical application using a 1 inch transducer head operating at 600 Watts, a frequency of 35,000 Hz provided satisfactory results. In other applications, a frequency between 15,000 Hz and 70,000 Hz may provide satisfactory results. The range of suitable amplitudes may vary with the type and size of the transducer head 28, however, generally, an amplitude of between about 0.0005 and 0.005 inches may be suitable for a range of applications. The preferred type and size of the transducer head 28 may depend on the geometry of the wrinkle, the ply stack-up, ply thickness and the shape of the tooling.

Figure 3:
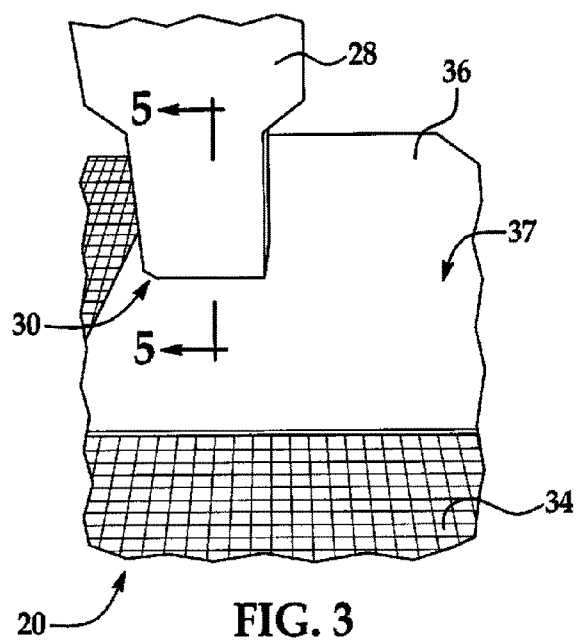
FIG. 3 is a perspective illustration similar to FIG. 2 but showing a protective sheet having been placed between the transducer head and the laminate.

Referring now to FIG. 3, in some applications, it may be advantageous to place a protective sheet 36 of material between the transducer face 30 and the surface 34 of the laminate 20. The sheet 36 may comprise, for example and without limitation, a Teflon® coated fiberglass fabric such as Armalon® having a substantially smooth upper surface 37. The sheet 36 may act to protect fibers in the top ply 22 from being deformed or otherwise disturbed by engagement with the moving face 30 of the transducer head 28. Additionally, the sheet 36 may function to better distribute the pressure applied by the transducer head 28 to the surface 34 of the laminate 20, while the smooth upper surface 37 provides an interface between the wrinkle 24 and the transducer face 30 having less friction than the surface 34. Finally, the protective sheet 36 also eliminates resin build-up on the transducer face 30 that may otherwise occur if the transducer head 28 directly engaged the surface 34 of the laminate 20.

Figure 4:
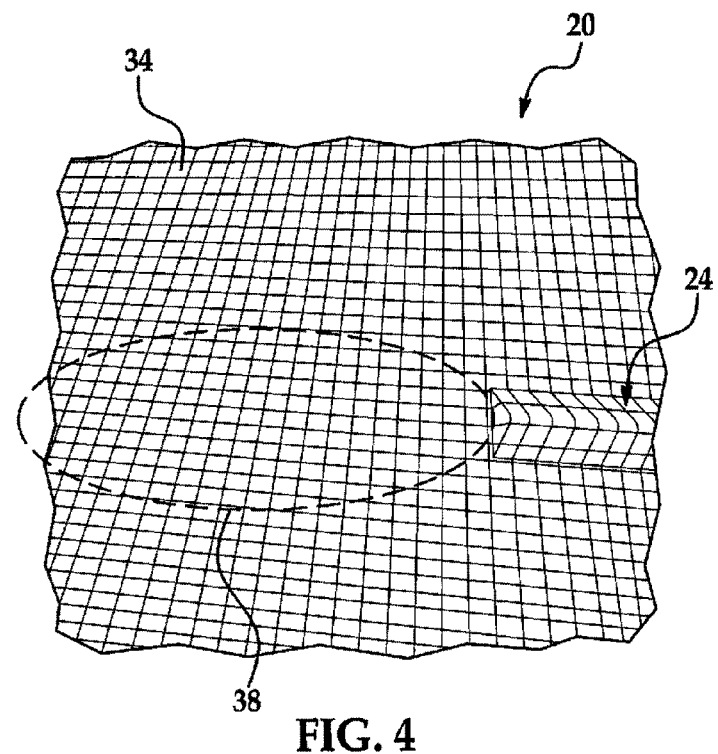
FIG. 4 is a perspective illustration of the uncured laminate shown in FIGS. 2 and 3, wherein a portion of the wrinkle has been reduced.

The transducer head 28 may be moved over the wrinkles 24 in any of various directions, such as in line with the direction or orientation of the wrinkles 24 or traverse to such orientation. FIG. 4 illustrates a wrinkle 24 that has been partially treated according to the disclosed embodiments. As illustrated in FIG. 4, a section 38 of the wrinkle 24 has been substantially reduced and substantially eliminated by the simultaneous application of vibrational energy and pressure using the method described above.

Figure 5:
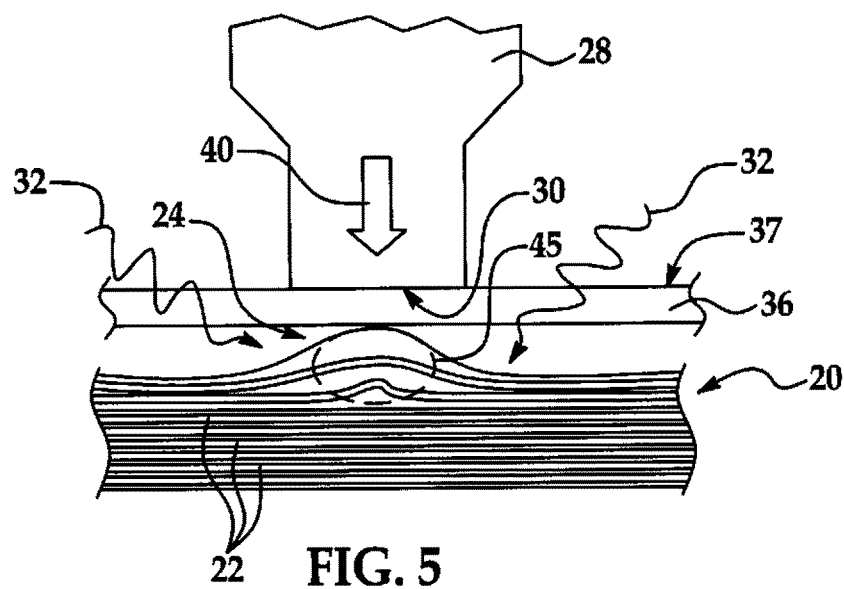
FIG. 5 is a sectional illustration taken along the line 5-5 in FIG. 3.

FIG. 5 illustrates the stacked relationship between the laminate 20, sheet 36 and transducer head 28. The sheet 36 is applied over the area of the wrinkle 24 which in this case, comprises the three upper plies designated by the numeral 45 which create a wrinkle 24. A downward pressure in the direction of the arrow 40 is applied by the transducer head 28 to the wrinkle 24 as vibrational energy is simultaneously applied. The high speed vibratory motion induced in the laminate plies 22 overcomes static friction in the uncured resin, permitting the fibers, which are typically arranged in bundles, to slip past each other and reduce wrinkle height. The vibratory motion may also create frictional heat in an amount sufficient to temporarily reduce the viscosity of the resin, thereby further encouraging relaxation of the wrinkle.

In some applications, it may be advantageous to also apply additional heat 32 to the wrinkle 24 near the transducer head 28 using a heat gun (not shown) or other suitable heat source, or to preheat the entire laminate 20, however, the applied heat should not be so great as to result in curing of the resin. Heating the wrinkle 24 may temporarily reduce the viscosity of the resin binder and thereby reduce friction between the reinforcing fibers which allows the wrinkle 24 to relax more readily.

Figure 6:
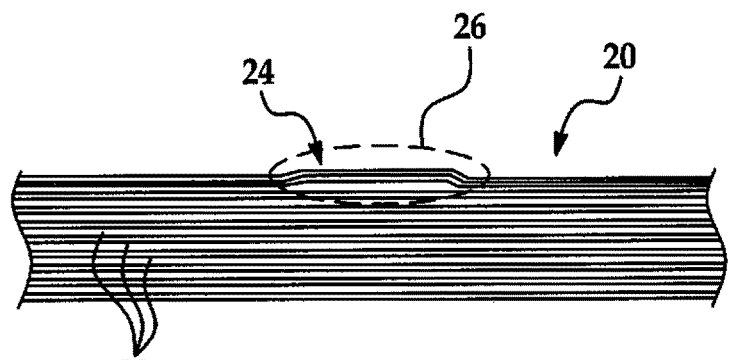
FIG. 6 is a cross sectional illustration of the laminate shown in FIG. 5 after the wrinkle has been reduced.

FIG. 6 illustrates the wrinkle 24 shown in FIG. 5 after treatment according to the disclosed method. The simultaneous application of high frequency, low amplitude vibrational energy and pressure allow the reinforcing fibers to slip relative to each other, resulting the flattening of the wrinkle 24. Although FIG. 6 depicts the wrinkle 24 as having been substantially reduced in height, in some applications the wrinkle may be essentially eliminated.

In some high-rate production environments where wrinkles may tend to occur in the same general areas of a laminate 20, it may be desirable to automate the method of reducing wrinkles described above. For example, the transducer head 28 may be mounted on the arm of a multi-axis robot (not shown) or an x,y,z stage (not shown) controlled by a computer (not shown) or a programmable logic controller (not shown).

Figure 7:
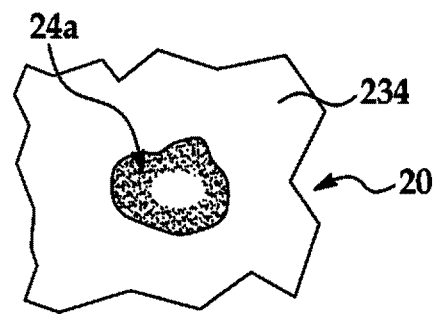
FIGS. 7-9 are plan views illustrating exemplary forms of wrinkles that may be reduced according to the disclosed embodiments.
Figure 8:
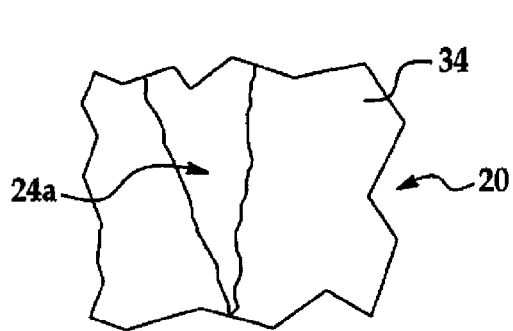
Figure 9:
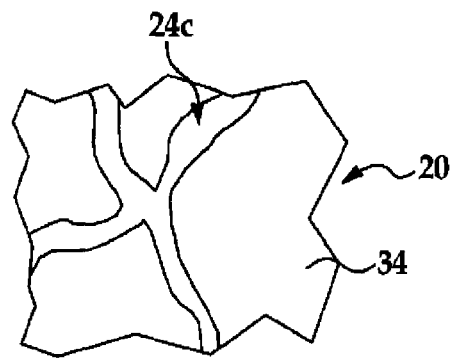

It should be noted here that although a simple, linearly shaped wrinkle 24 has been illustrated in FIGS. 1-6 for convenience in describing the embodiments, the disclosed embodiments may also be used to reduce wrinkles having a variety of other shapes. For example, the embodiments may be useful in reducing a generally bubble-shaped wrinkle 24a as shown in FIG. 7, a tapered wrinkle 24b as shown in FIG. 8, or intersecting wrinkles 24c as shown in FIG. 9, to name only few.

Figure 10:
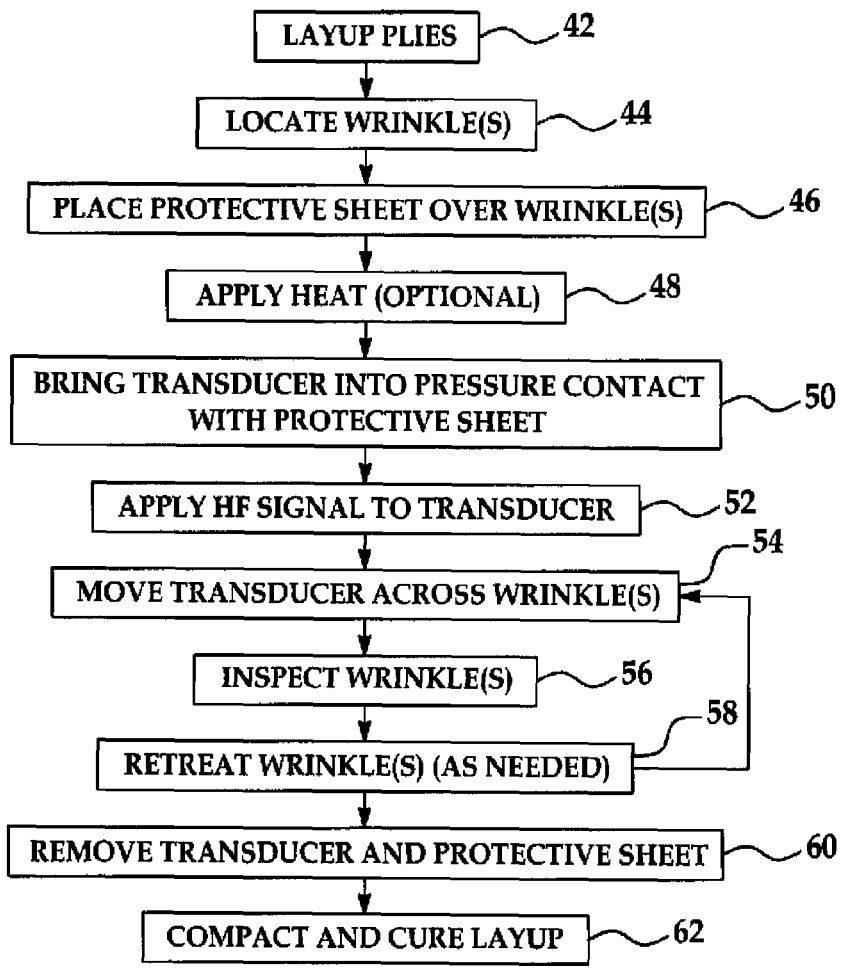
FIG. 10 is a simplified flow chart illustrating the steps of a method for reducing wrinkles in an uncured laminate.

The method of reducing wrinkles described above is further illustrated in the flow diagram of FIG. 10. Beginning at step 42, a plurality of prepreg plies 22 are laid up over suitable tooling (not shown). Next at 44, wrinkles present in the layup are located and optionally, at 46, the sheet 36 is placed over the upper surface of the layup. In some applications, as shown in 48, heat may be optionally applied to the wrinkle 24 either before (preheat) or during the wrinkle reduction process. At step 50, the transducer head 28 is brought into pressure contact with the sheet 36, and pressure is applied to the layup through the sheet 36. At step 52, a high frequency, low amplitude signal is applied to the transducer head 28, causing the latter to vibrate. Generally, these vibrations will be substantially normal to the surface 34 of the layup 24 (i.e., up and down), however they may have a lateral or oscillatory-like components.

As pressure and vibrational energy is continued to be applied to the wrinkle 24, the transducer head 28 is moved across the wrinkle 24, as shown in step 54. Following the wrinkle reduction treatment described above, the wrinkles 24 may be inspected at 56, and if necessary the wrinkles may be retreated as shown at step 58. When the wrinkles 24 have been substantially reduced or eliminated, the transducer head 28 and protective sheet 36 may be removed at step 60, following which the layup may be compacted and cured in the normal manner, as shown at step 62.

Figure 11:
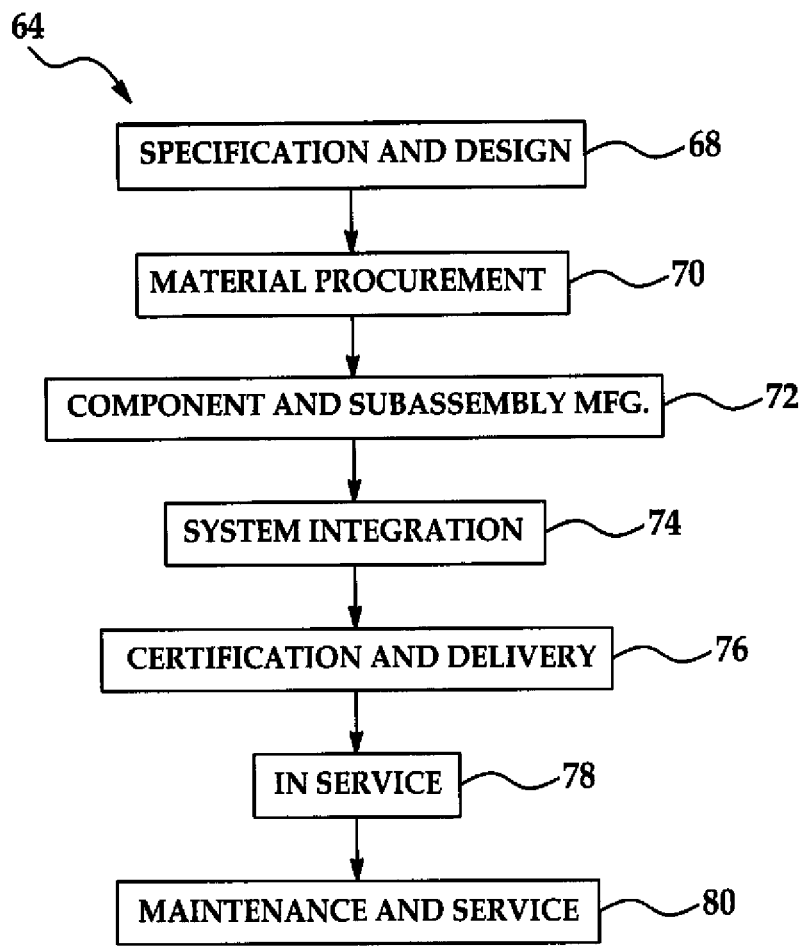
FIG. 11 is a flow diagram of aircraft production and service methodology.
Figure 12:
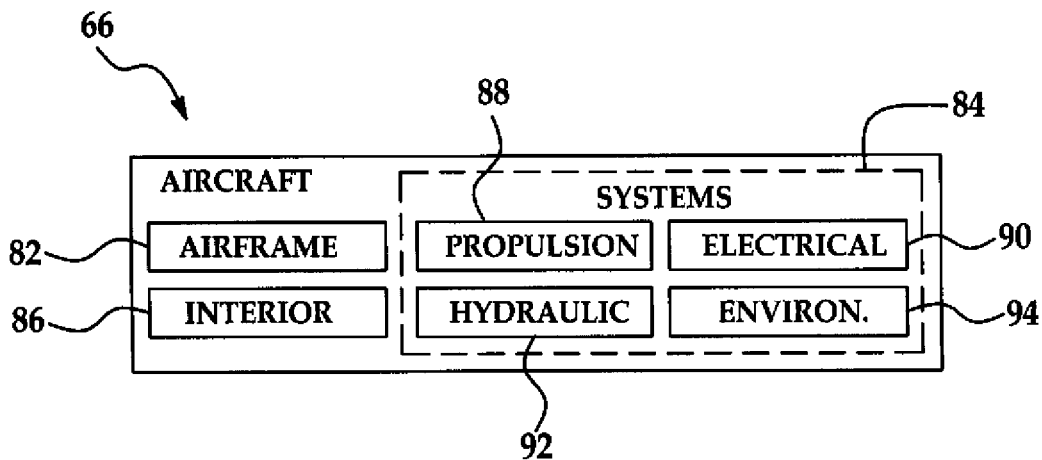
FIG. 12 is a block diagram of an aircraft.

Embodiments of the disclosure may find use in a variety of potential applications, particularly in the transportation industry, including for example, aerospace, marine and automotive applications. Thus, referring now to FIGS. 11 and 12, embodiments of the disclosure may be used in the context of an aircraft manufacturing and service method 64 as shown in FIG. 11 and an aircraft 66 as shown in FIG. 12. During pre-production, exemplary method 64 may include specification and design 68 of the aircraft 66 and material procurement 70. During production, component and subassembly manufacturing 72 and system integration 74 of the aircraft 66 takes place. Thereafter, the aircraft 66 may go through certification and delivery 76 in order to be placed in service 78. While in service by a customer, the aircraft 66 is scheduled for routine maintenance and service 80 (which may also include modification, reconfiguration, refurbishment, and so on).

Each of the processes of method 64 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 66 produced by exemplary method 64 may include an airframe 82 with a plurality of systems 84 and an interior 86. Examples of high-level systems 84 include one or more of a propulsion system 88, an electrical system 90, a hydraulic system 92, and an environmental system 94. Any number of other systems may be included. Although an aerospace example is shown, the principles of the disclosure may be applied to other industries, such as the marine and automotive industries.

Systems and methods embodied herein may be employed during any one or more of the stages of the production and service method 64. For example, components or subassemblies corresponding to production process 88 may be fabricated or manufactured in a manner similar to components or subassemblies produced while the aircraft 66 is in service. Also, one or more apparatus embodiments, method embodiments, or a combination thereof may be utilized during the production stages 72 and 74, for example, by substantially expediting assembly of or reducing the cost of an aircraft 66. Similarly, one or more of apparatus embodiments, method embodiments, or a combination thereof may be utilized while the aircraft 66 is in service, for example and without limitation, to maintenance and service 80.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of reducing a wrinkle in a fiber reinforced impregnated resin ply, comprising:
    forming a layup comprising said ply, the layup defining a surface; and
    subjecting the wrinkle to vibrations while applying downward pressure relative to the surface following forming said layup and prior to compacting and curing said layup, said vibrations having a frequency of at least 15,000 Hz and an amplitude of at least 0.0005 inches applied with a flat face head and the vibrations being normal to the surface.

2. The method of claim 1, wherein subjecting the wrinkle to vibration is performed by:
    bringing a transducer head into contact with the ply,
    exciting the transducer head to vibrate, and
    moving the transducer head over the wrinkle.

3. The method of claim 2, further comprising:
    using the transducer head to apply pressure to the wrinkle as the transducer head is moving over the wrinkle.

4. The method of claim 2, further comprising:
    protecting the ply by placing a protective sheet between the transducer head and the wrinkle.

5. The method of claim 2, further comprising:
    heating the ply in the area of the wrinkle.

6. A method of reducing wrinkles in an uncured composite layup, comprising:
    forming said layup having a surface;
    using a head to apply downward pressure to the layup relative to the surface in the area of the wrinkles following forming said layup and prior to compacting and curing said layup;
    moving the head over the wrinkles as the pressure is being applied to the layup; and
    applying vibrations to the wrinkles by vibrating the head as the pressure is being applied to the layup by the head, said vibrations having a frequency of at least 15,000 Hz and an amplitude of at least 0.0005 inches applied with the head such that the vibrations are normal to the surface.

7. The method of claim 6, further comprising:
    protecting the layup by placing a sheet over the layup in the area of the wrinkles, and wherein
    the pressure is applied by the head to the layup by pressing the head against the sheet.

8. The method of claim 7, wherein the sheet includes a substantially smooth protective surface against which the head is pressed.

9. The method of claim 6, further comprising:
    heating the ply at least in the area of the wrinkles.

10. A method of fabricating a composite aircraft subassembly, comprising:
    forming a multi-ply fiber-reinforced composite layup having a surface, wherein at least one of the plies includes a wrinkle;
    reducing the wrinkle following forming said layup and prior to compacting and curing said fiber reinforced composite layup by;
        using a transducer head to apply downward pressure to the at least one ply relative to the surface in the area of the wrinkle,
        moving the transducer head over the ply,
        exciting the transducer head to vibrate as the transducer head applies pressure to the at least one ply, said vibrations having a frequency of at least 15,000 Hz and an amplitude of at least 0.0005 inches applied with the transducer head such that the vibrations are normal to the surface;
compacting the layup; and
curing the layup.

11. The method of claim 10, further comprising:
covering the wrinkle with a smooth sheet by placing the smooth sheet over at least a portion of the layup; and
removing the sheet from the layup after the wrinkle has been reduced,
wherein using a transducer head to apply pressure to the at least one ply includes pressing the transducer head against the sheet.

12. The method of claim 10, further comprising:
heating the at least one ply in the area of the wrinkle.

13. A method of fabricating a composite aircraft subassembly, comprising:
forming a multi-ply fiber-reinforced composite layup having a surface, wherein the layup includes a wrinkle;
reducing the wrinkle following forming said layup and prior to compacting and curing said fiber reinforced composite layup by;
placing a substantially smooth sheet over the layup covering the wrinkle,
bringing a transducer head into contact with the sheet,
applying downward pressure to the wrinkle relative to the surface by pressing the transducer head against the sheet in the area of the wrinkle,
moving the transducer head over the layup as the transducer head is being pressed against the sheet,
heating the layup in at least the area of the wrinkle;
exciting the transducer head to vibrate with a high frequency, low amplitude signal as the transducer head is being pressed against the sheet, said vibrations having a frequency of at least 15,000 Hz and an amplitude of at least 0.0005 inches applied with the transducer head such that the vibrations are normal to the surface;
removing the sheet after the wrinkle has been reduced
compacting the layup; and
curing the layup.

14. The method of claim 13, wherein the transducer head is substantially flat where the transducer head contacts the surface.

* * * * *